(12) United States Patent
Ito

(10) Patent No.: US 7,580,447 B2
(45) Date of Patent: Aug. 25, 2009

(54) RECEPTION DEVICE AND RADIO COMMUNICATION SYSTEM USING THE SAME

(75) Inventor: Takumi Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 618 days.

(21) Appl. No.: 10/547,505

(22) PCT Filed: May 20, 2004

(86) PCT No.: PCT/JP2004/007239

§ 371 (c)(1),
(2), (4) Date: Aug. 31, 2005

(87) PCT Pub. No.: WO2004/105266

PCT Pub. Date: Dec. 2, 2004

(65) Prior Publication Data

US 2006/0256842 A1    Nov. 16, 2006

(30) Foreign Application Priority Data

May 21, 2003    (JP) .............................. 2003-142800

(51) Int. Cl.
*H04B 1/00* (2006.01)
*H04B 1/10* (2006.01)
*H04B 17/02* (2006.01)

(52) U.S. Cl. ..................... 375/148; 375/349; 455/133

(58) Field of Classification Search .............. 375/144, 375/148, 260, 267, 285, 346–350; 455/132–135; 370/334–335

See application file for complete search history.

(56) References Cited

U.S. PATENT DOCUMENTS 6,047,019 A * 4/2000 Ishii ........................... 375/148

6,385,181 B1 5/2002 Tsutsui et al.
6,850,505 B1 * 2/2005 Ostberg ....................... 370/335

(Continued)

FOREIGN PATENT DOCUMENTS

| CN | 1309478 A | 8/2001 |
|---|---|---|
| JP | 10-154952 A | 6/1998 |
| JP | 2003-338802 A | 11/2003 |

OTHER PUBLICATIONS

Taira, A., et al., "Yusokan MIMO Densoro ni okeru Multi Carrier System no Jushin Tokusei", 2003 Nen The Institute of Electronics, Information and Communication Engineers, Sogo Taikai Koen Ronbunshu (Mar. 2003).

(Continued)

*Primary Examiner*—Khanh C Tran
(74) *Attorney, Agent, or Firm*—Foley & Lardner LLP

(57) ABSTRACT

A reception device 81) has reception antennas (11-1 to 11-*n*) for receiving signals transmitted from a plurality of transmission antennas and outputting reception signals. A channel estimation device (12) estimates a channel between the antennas and outputs a channel estimation value H. A path selection device (13) inputs the channel estimation value H and calculates the channel correlation value between the transmission/reception antennas from the channel estimation value H. If the calculation result is smaller than a reference value, the path selection device (13) outputs a path selection signal selecting a path of a high power with a higher priority. On the other hand, if the calculation result is greater than the reference value, the path selection device (13) outputs a path selection signal selecting, with a higher priority, a path having a lower correlation value with a path detected by the other reception antenna. Despread devices (14-1 to 14-*kn*) input the reception signal and the path selection signal and output a despread signal. A demodulation device (15) inputs a despread signal and outputs a reproduction series.

30 Claims, 8 Drawing Sheets

U.S. PATENT DOCUMENTS

| | | | |
|---|---|---|---|
| 6,954,655 B2 * | 10/2005 | Rudrapatna et al. | 455/562.1 |
| 6,990,137 B2 * | 1/2006 | Smee et al. | 375/142 |
| 7,120,192 B2 | 10/2006 | Kumura | |
| 2002/0181628 A1 * | 12/2002 | Iochi et al. | 375/347 |

OTHER PUBLICATIONS

Choi, R., et al., MIMO CDMA Antenna System for SINR Enhancement, Wireless Communications, IEEE Transactions, vol. 2, No. 2 (Mar. 2003).

* cited by examiner

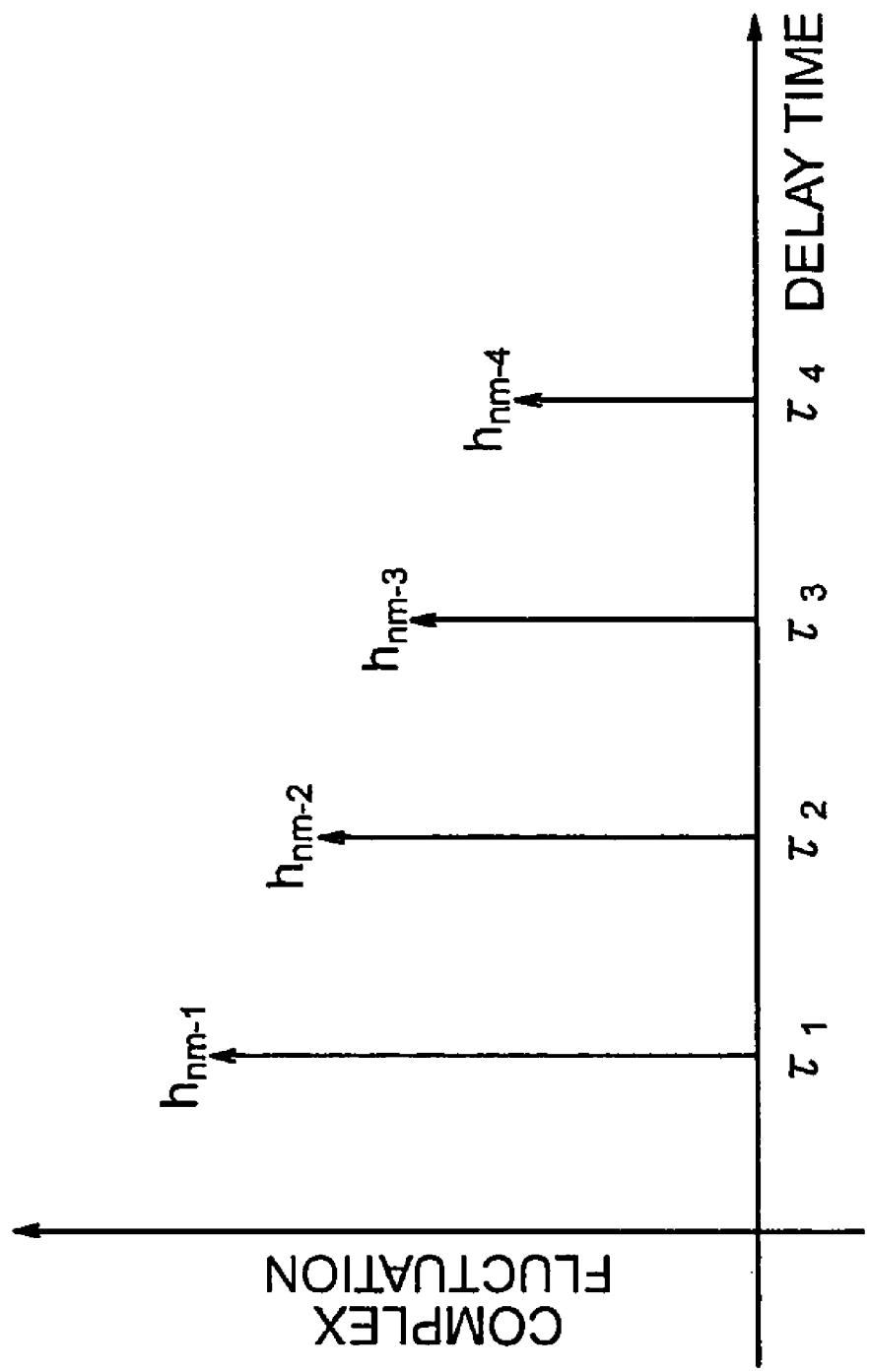

RECEPTION DEVICE AND RADIO COMMUNICATION SYSTEM USING THE SAME

TECHNICAL FIELD

The present invention relates to a reception device and a radio communication system using the reception device and, in particular, to a spread-spectrum radio communication system using a plurality of antennas.

BACKGROUND ART

In spread-spectrum radio communication systems, the reception quality is improved by separating or combining a plurality of paths identified by a reception device. When a transmission device and a reception device use a plurality of antennas, the reception quality can be improved by selecting and combining paths using the same technique.

With reference to FIG. 1, a spread-spectrum radio communication system disclosed in Japanese Unexamined Patent Application Publication No. 2001-230702 is described. Here, the number m of transmission antennas is 2 and the number n of reception antennas is 2. In a transmission device 5, the same spreading code is used for all transmission antennas 21-1 and 21-2. Additionally, a delay time in the path of a reception antenna 11-1 is identical to that of a reception antenna 11-2. The propagation path for each antenna includes two paths, as shown in FIG. 2. Furthermore, a reception device 4 has one de-spreader unit.

FIG. 3 illustrates an exemplary configuration of the reception device 4. Reception signals $r_1(t)$ and $r_2(t)$ received by the respective first antenna 11-1 and the second antenna 11-2 are expressed by the following equations:

$$r_1(t) = h_{11-1}c(t-\tau_1)b_1(t-\tau_1) + h_{11-2}c(t-\tau_2)b_1(t-\tau_2) +$$
$$\qquad h_{12-1}c(t-\tau_1)b_2(t-\tau_1) + h_{12-2}c(t-\tau_2)b_2(t-\tau_2) + n_1(t)$$
$$r_2(t) = h_{21-1}c(t-\tau_1)b_1(t-\tau_1) + h_{21-2}c(t-\tau_2)b_1(t-\tau_2) +$$
$$\qquad h_{22-1}c(t-\tau_1)b_2(t-\tau_1) + h_{22-2}c(t-\tau_2)b_2(t-\tau_2) + n_2(t)$$

where the fluctuation of the propagation path is sufficiently delayed with respect to the fluctuation of the transmission signal. $\tau_1$ and $\tau_2$ represent paths. $c(t-\tau_1)$, $b_m(t-\tau_1)$, $n_n(t)$ are a spreading code, a data signal from an m-th transmission antenna 21-$m$, and a noise signal of an n-th reception antenna 11-$n$, respectively. $h_{nm-1}$ represents a first path between the m-th transmission antenna 21-$m$ and the n-th reception antenna 11-$n$. As described above, m=n=2.

A channel estimation unit 12 carries out channel estimation using received signals and outputs the obtained channel estimation value H. In general, a spread-spectrum communication system selects the paths in descending order of power. Accordingly, a maximum-power-path selection unit 41 selects a path having the largest power and outputs a maximum path signal $X_{max}$. Here, it is assumed that a preceding path has larger power. In this case, de-spreader units 14-1 and 14-2 de-spread based on the maximum path signal in synchronization with the timing of the preceding path.

For the sake of simplicity, one received symbol is focused on. A de-spreading signal $y_1$ of the first reception antenna 11-1 is given by the following equation (1):

$$y_1 = \int_{\tau_2} c(t-\tau_1)r_1(t)dt \qquad (1)$$
$$= h_{11-1}b_1 + h_{12-1}b_2 + R(\tau_1 - \tau_2)\sum_{m=1}^{2} h_{1m-2}b_m(t-\tau_2) + n'_1$$

where $T_s$ is one symbol time, R is an auto-correlation function of a spreading code, and $n'_1$ is Gaussian noise.

As shown in FIG. 4, a widely used auto-correlation function of a spreading code exhibits a sharp peak at a time difference of zero and exhibits a sufficiently small value at a time difference of other values. Therefore, the second term of equation (1) can be ignored here.

As a result, the de-spreading signal $y_1$ is expressed as:

$$y_1 = h_{11-1}b_1 + h_{12-1}b_2 + n_1.$$

Similarly, a de-spreading signal $y_2$ of the second reception antenna 11-2 is given by the following equation:

$$y_2 = h_{21-1}b_1 + h_{22-1}b_2 + n_2.$$

A demodulation unit 15 inputs the de-spreading signals and carries out demodulation to reproduce a data sequence. The de-spreading signal is given by the following equation (2) in vector representation:

$$Y = \begin{bmatrix} y_1 \\ y_2 \end{bmatrix} \qquad (2)$$
$$= \begin{bmatrix} h_{11-1} & h_{12-1} \\ h_{21-1} & h_{22-1} \end{bmatrix}\begin{bmatrix} b_1 \\ b_2 \end{bmatrix} + \begin{bmatrix} n_1 \\ n_2 \end{bmatrix} + Hb + n$$

The demodulation unit 15 reproduces a transmission sequence by, for example, premultiplying the equation by a reverse matrix of the channel estimation value H, as follows:

$$b_0 = H^{-1}Y = b + H^{-1}n.$$

When all of the propagation paths are independent, a reverse matrix of the above-described channel matrix can be correctly obtained. However, if channel replies have correlation, a reverse matrix does not exist, thereby disabling reception.

For example, if a propagation path between the first transmission antenna 21-1 and the first reception antenna 11-1 has complete correlation with a propagation path between the first transmission antenna 21-1 and the second reception antenna 11-2 and if a propagation path between the second transmission antenna 21-2 and the first reception antenna 11-1 has complete correlation with a propagation path between the second transmission antenna and the second reception antenna, $h_{11-1}=h_{21-1}$, $h_{11-2}=h_{21-2}$, $h_{12-1}=h_{22-1}$, and $h_{12-2}=h_{22-2}$. In this case, the channel estimation value H is given by the following equation (3):

$$H = \begin{bmatrix} h_{11-1} & h_{22-1} \\ h_{11-1} & h_{22-1} \end{bmatrix} \qquad (3)$$

This results in $|H|=0$, and therefore, the inverse matrix does not exist. Consequently, it is hard to perform the demodulation process.

Accordingly, it is an object of the present invention to solve the above-described problem and provide a reception device that achieves superior communication quality even when propagation paths have correlation.

It is another object of the present invention to provide a radio communication system using the reception device.

DISCLOSURE OF INVENTION

A reception device according to the present invention includes n number of reception antennas for receiving spread spectrum signals transmitted from a transmission device via m number of transmit antennas, where n is an integer greater than or equal to 2 and m is an integer greater than or equal to 2. The reception device also includes a path selection unit for selecting a path for de-spreading the signal received by the reception antennas and outputting a selection result as a path selection signal. The reception device further includes $K_n$ number of de-spreader units for de-spreading the signal received by the reception antennas based on the path selection signal and outputting the de-spread signals, where $K_n$ is an integer greater than or equal to 1, n represents an nth reception antenna, and $1 \leq n \leq K_n$.

A radio communication system according to the present invention includes a reception device that comprises n number of reception antennas for receiving spread spectrum signals transmitted from a transmission device via m number of transmit antennas, where m is an integer greater than or equal to 2 and n is an integer greater than or equal to 2. The reception device further comprises a path selection unit for selecting a path for de-spreading the signal received by the reception antennas and outputting a selection result as a path selection signal, and $K_n$ number of de-spreader units for de-spreading the signal received by the reception antennas based on the path selection signal and outputting the despreaded signals, where $K_n$ is an integer greater than or equal to 1, n represents an nth reception antenna, and $1 \leq n \leq K_n$. The reception device selects a path in accordance with a correlation value of propagation paths.

In a reception device according to the present invention, a reception antenna receives a spread spectrum signal transmitted from a transmission device. A path selection unit inputs the spread spectrum signal received by the reception antenna, selects a path for de-spreading the signal, and outputs a selection result as a path selection signal. A de-spreader unit inputs the signal received by the reception antenna and the path selection signal, and outputs a de-spread signal based on the path selection signal.

A first path selection unit according to the present invention calculates a correlation value of propagation paths among the m number of transmit antennas and the n number of reception antennas. If the calculation result is smaller than a predetermined reference value, the path selection unit independently selects $K_n$ number of paths having a largest power at each of the n number of reception antennas. On the other hand, if the calculation result is greater than the predetermined reference value, the path selection unit preferentially selects $K_n$ number of paths having a low correlation with paths identified by the other reception antennas, at each of the n number of reception antennas.

A second path selection unit according to the present invention employs the amplitude of a complex correlation value as the predetermined reference value.

A third path selection unit according to the present invention determines priorities of the n number of reception antennas and selects P number of paths for de-spreading at each of the reception antennas in accordance with the determined priorities, where P is an integer greater than or equal to 1 and $1 \leq P \leq K_n$. The third path selection unit repeats the above-described selection operation until the number of paths identified by each of the reception antennas reaches $K_n$.

A fourth path selection unit according to the present invention detects a path having maximum power from among paths identified by each of the n number of reception antennas for each antenna when determining priorities of the reception antennas, and the path selection unit assigns a higher priority to a reception antenna having a detected path of a higher power.

A fifth path selection unit according to the present invention detects a path having minimum power from among paths identified by each of the n number of reception antennas for each antenna when determining priorities of the reception antennas, and the path selection unit assigns a higher priority to a reception antenna having a path of a lower detected power.

A sixth path selection unit according to the present invention detects a path having maximum power from among paths identified by each of the n number of reception antennas for each antenna when determining priorities of the reception antennas, and the path selection unit assigns a higher priority to a reception antenna having a path of a lower detected power.

A seventh path selection unit according to the present invention detects a path having minimum power from among paths identified by each of the n number of reception antennas for each antenna when determining priorities of the reception antennas, and the path selection unit assigns a higher priority to a reception antenna having a path of a higher detected power.

A eighth path selection unit according to the present invention calculates average power of paths identified by each of the n number of reception antennas for each antenna when determining priorities of the reception antennas, and the path selection unit assigns a higher priority to a reception antenna having a higher average power value.

A ninth path selection unit according to the present invention calculates average power of paths identified by each of the n number of reception antennas for each antenna when determining priorities of the reception antennas, and the path selection unit assigns a higher priority to a reception antenna having a lower average power value.

A tenth path selection unit according to the present invention calculates the number of paths having a power exceeding $P_{th}$ from among paths identified by each of the n number of reception antennas for each antenna when determining priorities of the reception antennas, where $P_{th}$ is any real value, and the path selection unit assigns a higher priority to a reception antenna having more paths exceeding $P_{th}$.

A eleventh path selection unit according to the present invention calculates the number of paths having a power exceeding $P_{th}$ from among paths identified by each of the n number of reception antennas for each antenna when determining priorities of the reception antennas, where $P_{th}$ is any real value, and the path selection unit assigns a higher priority to a reception antenna having less paths exceeding $P_{th}$.

A twelfth path selection unit according to the present invention detects a path having an earliest incoming time from among paths identified by each of the n number of reception antennas for each antenna when determining priorities of the reception antennas, and the path selection unit assigns a higher priority to a reception antenna having a detected path with an earlier incoming time.

A thirteenth path selection unit according to the present invention detects a path having an earliest incoming time from among paths identified by each of the n number of reception antennas for each antenna when determining priorities of the reception antennas, and the path selection unit assigns a higher priority to a reception antenna having a detected path with a later incoming time.

A fourteenth path selection unit according to the present invention calculates an average delay time weighted by a power of a path among paths identified by each of the n number of reception antennas when determining priorities of the reception antennas, and the path selection unit assigns a higher priority to a reception antenna having a shorter calculated average delay time.

A fifteenth path selection unit according to the present invention calculates an average delay time weighted by a power of a path among paths identified by each of the n number of reception antennas when determining priorities of the reception antennas, and the path selection unit assigns a higher priority to a reception antenna having a longer calculated average delay time.

When determining priorities of the n number of reception antennas, a sixteenth path selection unit according to the present invention determines the priorities at random.

When determining the path for de-spreading at one of the reception antennas, a seventeenth path selection unit according to the present invention determines a union of sets of incoming times of paths identified by each of the n number of reception antennas as a total set and determines a selected path set using path information about paths selected for the reception antenna and the other reception antennas. The seventeenth path selection unit also determines a difference between the total set and the selected path set as an unselected path set, and determines the path used for de-spreading from the unselected path set.

When determining the selected path set, an eighteenth path selection unit according to the present invention determines samples from F samples before the incoming time of the path used for de-spreading at one of the reception antennas to B samples after the incoming time as a partial set of the selected path set, creates a union of the partial set of the selected path set for all of the n number of reception antennas, and determines the created set as the selected path set, where F is an integer greater than or equal to 0 and B is an integer greater than or equal to 0.

When determining the path used for de-spreading from an unselected path group, a nineteenth path selection unit according to the present invention selects a path having a highest reception power from the unselected path group.

When determining the path used for de-spreading from an unselected path group, a twentieth path selection unit according to the present invention selects a path having an earliest incoming time from the unselected path group.

When determining the path used for de-spreading from an unselected path group, a twenty-first path selection unit according to the present invention selects a path at random from the unselected path group.

A twenty-second path selection unit according to the present invention selects the path used for de-spreading at random.

A spread-spectrum communication system according to the present invention forms a radio communication system by employing a reception device that selects a path in accordance with a correlation value of propagation paths.

By employing the above-described structures and operations, the reception device and the radio communication system according to the present invention can achieve superior communication quality even when propagation paths have correlation.

BRIEF DESCRIPTION OF THE DRAWINGS

FIG. 8 illustrates an example of a propagation path model in the embodiment shown in FIG. 7.

BEST MODE FOR CARRYING OUT THE INVENTION

Figure 3:
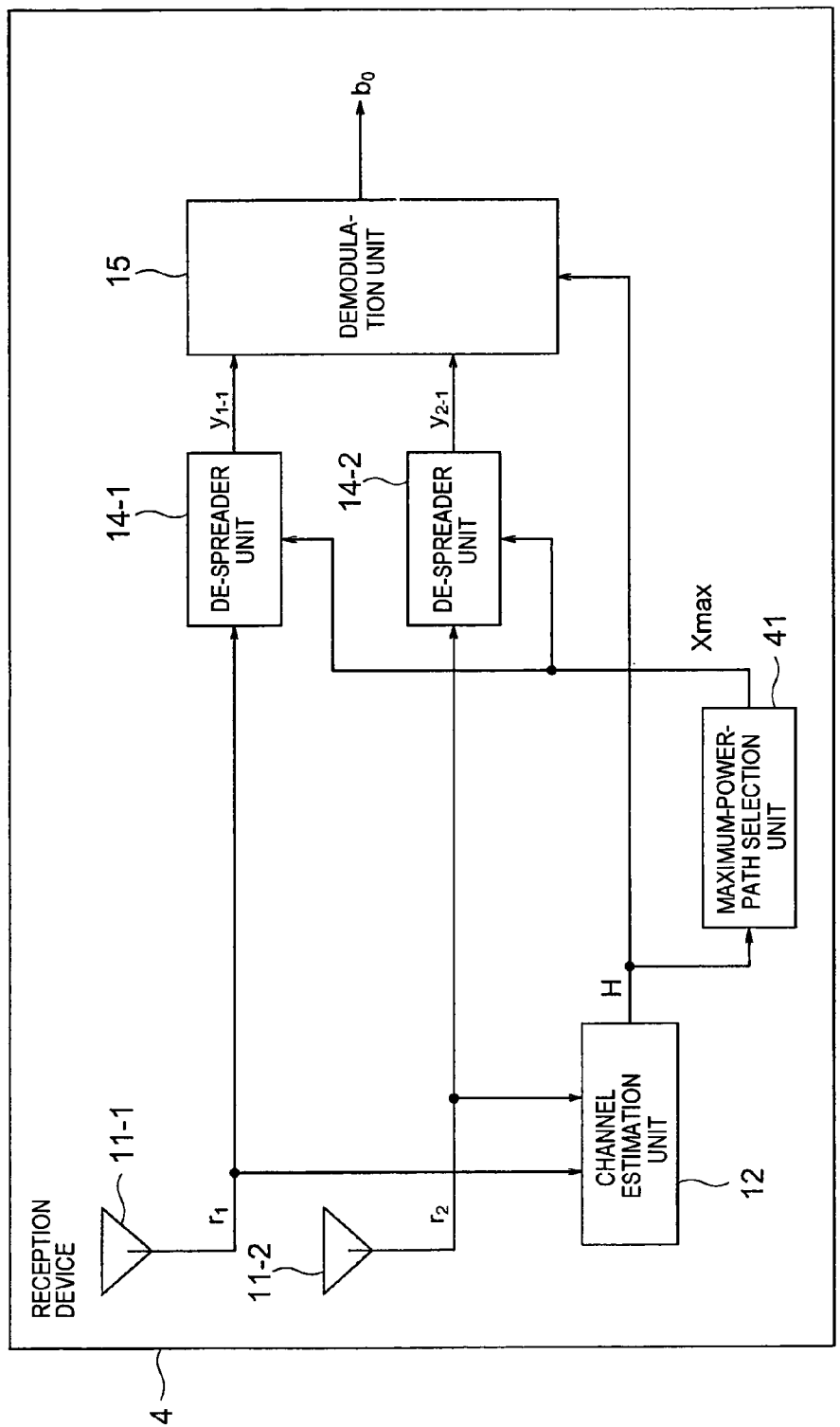
FIG. 3 is a block diagram illustrating the configuration of a reception device shown in FIG. 1.
Figure 4:
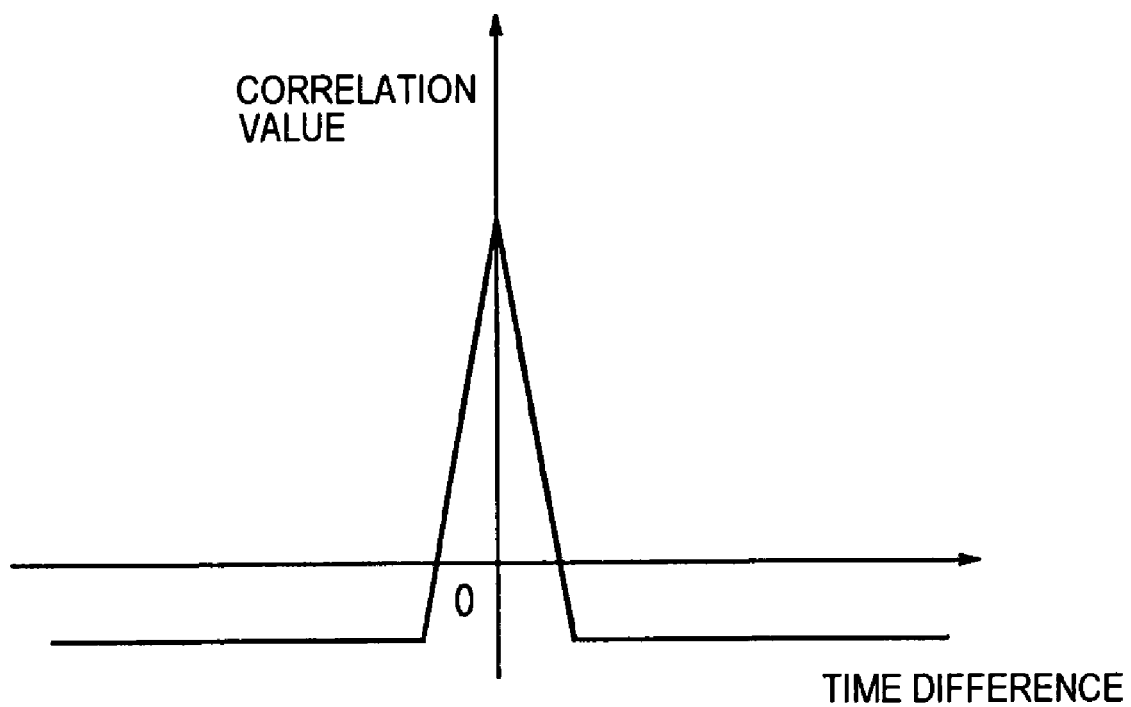
FIG. 4 illustrates an example of an auto-correlation function of a spreading code in the radio communication system shown in FIG. 1.
Figure 5:
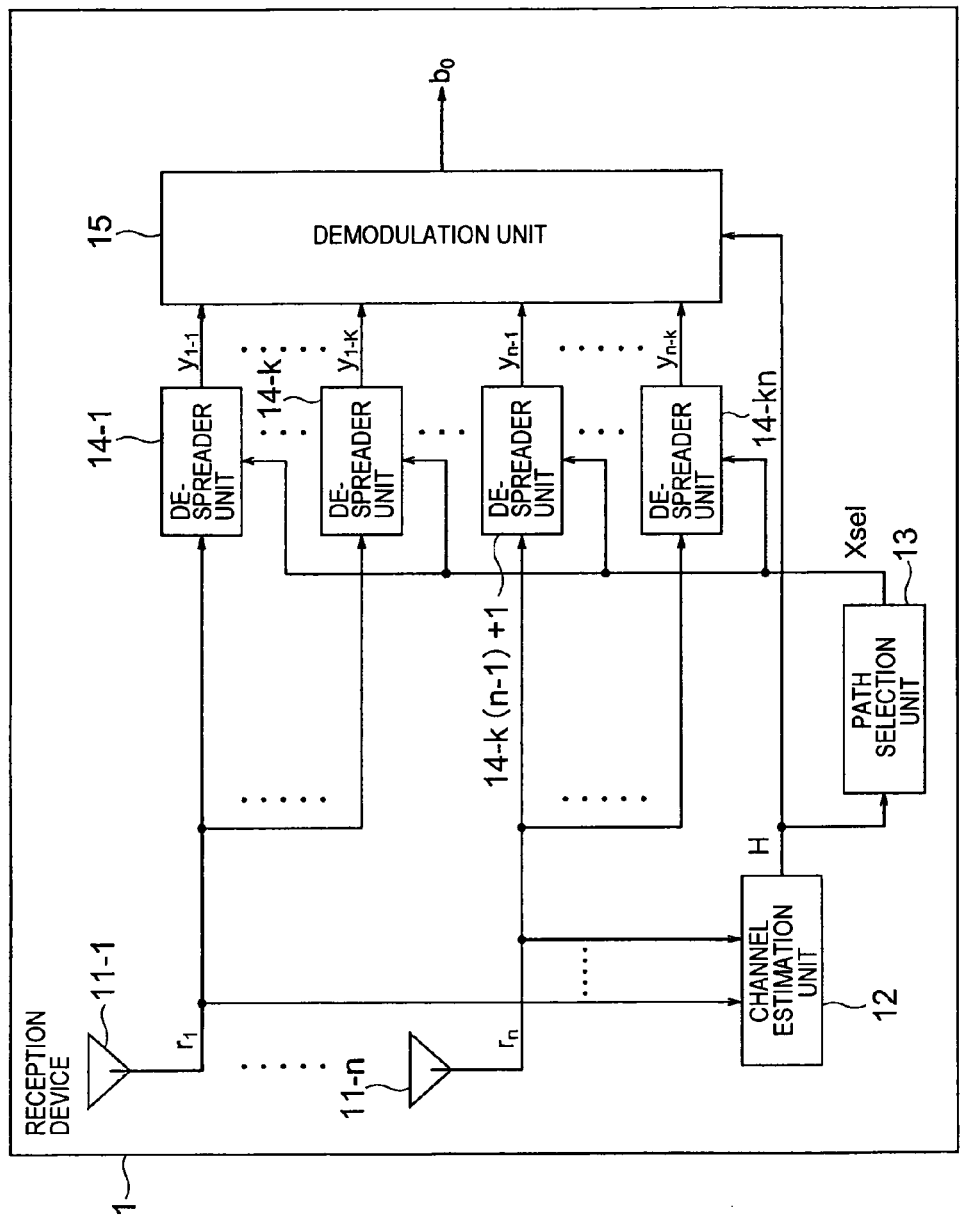
FIG. 5 is a block diagram illustrating the configuration of a reception device according to a preferred embodiment of the present invention.

FIG. 5 is a block diagram of a reception device according to an exemplary embodiment of the present invention. In FIG. 5, identical elements to those of the reception device illustrated and described in relation to FIG. 3 are designated by identical reference numerals. A reception device 1 includes n number of reception antennas 11-1 to 11-$n$, a channel estimation unit 12, a path selection unit 13, n number of de-spreader units 14-1 to 14-$kn$, and a demodulation unit 15.

The reception device 1 receives spread spectrum signals transmitted from a transmission device (not shown) via the reception antennas 11-1 to 11-$n$. The reception device 1 then outputs reception signals $r_1$ to $r_n$. The channel estimation unit 12 carries out channel estimation using the reception signals $r_1$ to $r_n$, and outputs an estimated channel information H.

The path selection unit 13 receives the channel information H as an input and outputs a path selection signal $X_{sel}$. At that time, the path selection unit 13 first calculates a channel correlation value. If the calculated correlation value is smaller than a predetermined reference value, the path selection unit 13 outputs the path selection signal $X_{sel}$ to preferentially select a path having a higher power at each of the reception antennas 11-1 to 11-$n$. In contrast, if the calculated correlation value is greater than the predetermined reference value, the path selection unit 13 outputs the path selection signal $X_{sel}$ to preferentially select a path having a low correlation with other reception antennas.

The de-spreader units 14-1 to 14-$kn$ de-spread the reception signals $r_1$ to $r_n$ in accordance with the path selection signal $X_{sel}$ and output de-spreading signals $y_{n-k}$. The demodulation unit 15 inputs the de-spreading signals $y_{n-k}$ to demodulate the signals into a data sequence, and outputs a reproduced signal $b_0$.

Figure 1:
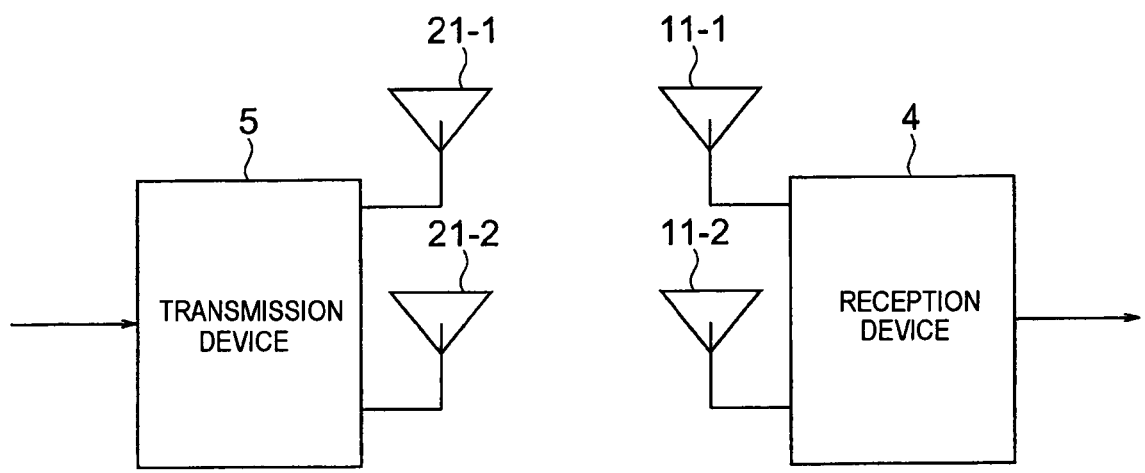
FIG. 1 is a block diagram illustrating a known radio communication system.
Figure 2:
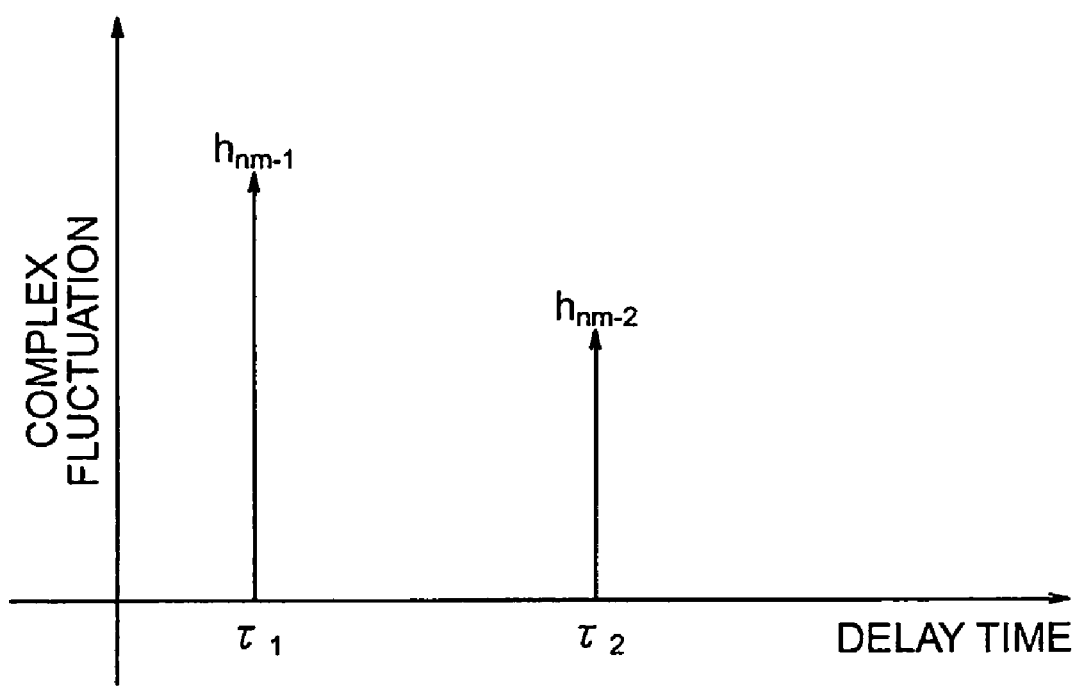
FIG. 2 illustrates an example of a propagation path model in the radio communication system shown in FIG. 1.
Figure 6:
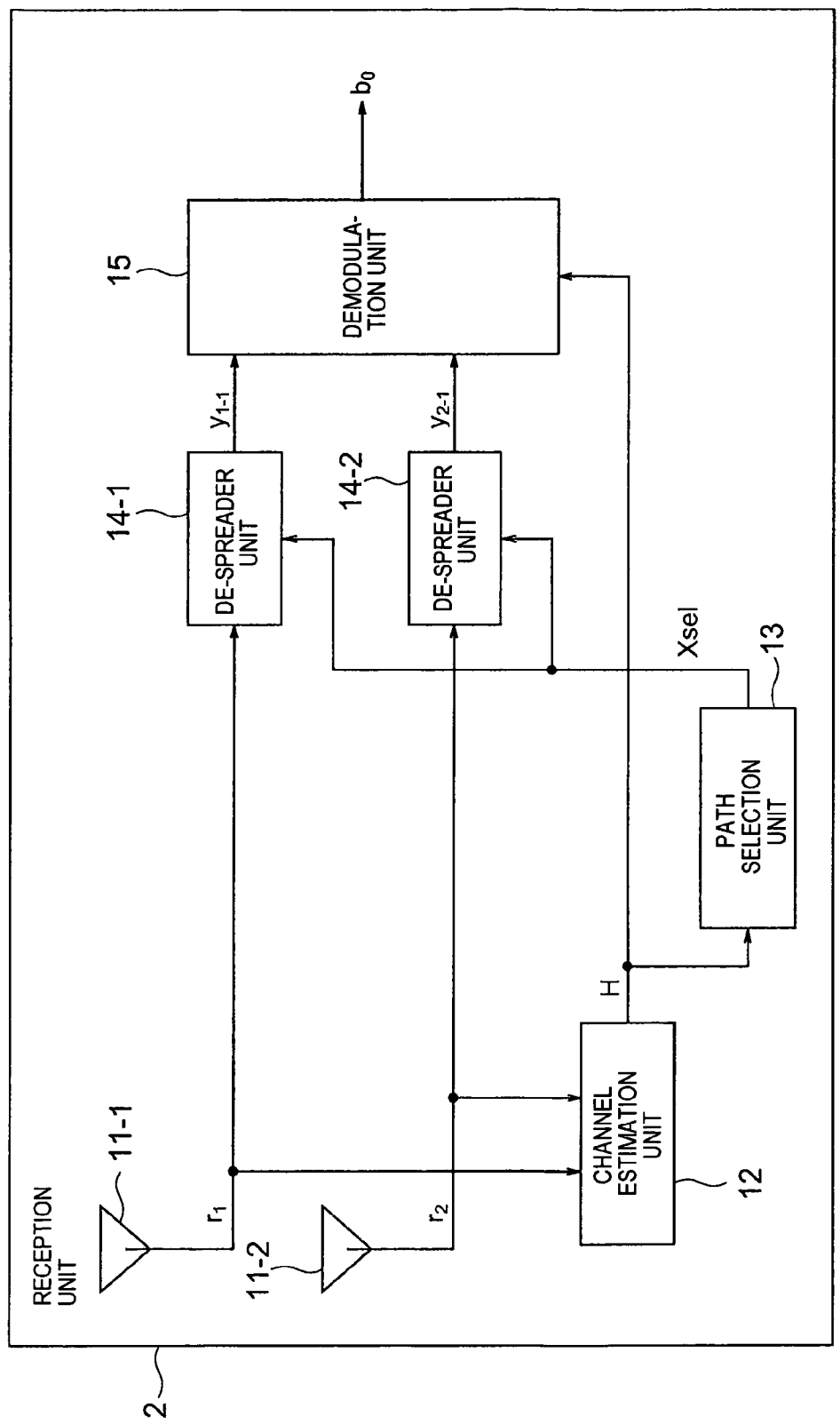
FIG. 6 is a block diagram illustrating the configuration of a reception device having two reception antennas according to the present invention.

FIG. 6 is a block diagram illustrating the configuration of a reception device including two reception antennas according to the present invention. As shown in FIG. 6, a reception device 2 includes two reception antennas 11-1 and 11-2, which correspond to the number (two) of the transmission antennas of a transmission device (not shown). De-spreader units 14-1 and 14-2 are connected to the reception antennas 11-1 and 11-2, respectively. All of the propagation paths between the transmission antennas and the reception antennas comply with the path model described with reference to FIG. 2. Furthermore, signals transmitted from the transmission antennas have complete correlation. The paths have no correlation. Also, the transmission antennas have no correlation.

In the transmission device, the same spreading code is employed for all of the transmission antennas. Here, a reception signal is given by the following equation (4):

$$r_n(t) = \sum \sum h_{nm-1} c(t-\tau_1) b_m(t-\tau_1) + n_n(t) \quad (4)$$

The channel estimation unit 12 carries out channel estimation using the reception signals and outputs channel information H. The path selection unit 13 calculates a channel correlation using the channel information H.

In general, a correlation coefficient for complex numbers is given by the following formula (5).

$$\frac{ab^*}{|a||b|} \quad (5)$$

For example, to obtain a correlation coefficient between $h_{11-1}$ and $h_{12-1}$, since these paths have a complete correlation, that is, $h_{11-1}=h_{12-1}$, the correlation coefficient can be expressed as the following equation (6):

$$\frac{h_{11-1} h_{11-1}^*}{|h_{11-1}||h_{12-1}|} = \frac{|h_{11-1}|^2}{|h_{11-1}|^2} \quad (6)$$
$$= 1$$

For example, if a value of 0.5 is used as a predetermined reference value, the calculated correlation coefficient exceeds the predetermined reference value.

Thus, if a calculated correlation coefficient exceeds a predetermined reference value, the path selection unit 13 determines a path selection signal $X_{sel}$ that preferentially selects a path having a low correlation with a path identified by another reception antenna.

First, the path selection unit 13 determines priorities of the reception antennas 11-1 and 11-2. Here, the first reception antenna 11-1 has a higher priority. The path selection unit 13 then determines a total set U, a selected path set $U_1$, and an unselected path set $U_2$ based on path incoming times of all the paths. The total set U is a union of sets of incoming times of paths identified by the reception antennas 11-1 and 11-2. The total set U is expressed as:

$$U=\{\tau_1, \tau_2\}$$

On the other hand, the selected path set $U_1$ is an empty set. The unselected path set is a difference between the total set U and the selected path set $U_1$. The unselected path set is expressed as:

$$U_2=\{\tau_1, \tau_2\}$$

Based on these sets, the path selection unit 13 selects a path for the first reception antenna 11-1 having a higher priority from the unselected path set $U_2$. Here, it is assumed that the path $\tau_1$ is selected.

Next, the path selection unit 13 updates the selected path set and the unselected path set using the selected path $\tau_1$, as follows:

$$U_1=\{\tau_1\}$$

$$U_2=U-U_1=\{\tau_2\}$$

In the same manner as described above, a path is selected from the unselected path set for the second reception antenna 11-2 having the second priority. Here, the path $\tau_2$ is selected. Finally, the path selection unit 13 outputs a path selection signal $X_{sel}$ obtained through the above-described steps.

The de-spreader units 14-1 and 14-2 for the respective reception antennas 11-1 and 11-2 de-spread received signals based on the path selection signal and output respective de-spreading signals $y_{1-1}$ and $y_{2-1}$. At that time, a de-spreading signal obtained by the first reception antenna 11-1 is given by the following equation:

$$y_{1-1}=h_{11-1}b_1+h_{22-1}b_2+n_1$$

On the other hand, a de-spreading signal obtained by the second reception antenna 11-2 is given by the following equation:

$$y_{2-1}=h_{11-2}b_1+h_{22-2}b_2+n_2$$

These equations are expressed as the following matrix notation (7):

$$Y = \begin{bmatrix} y_{1-1} \\ y_{2-1} \end{bmatrix} \quad (7)$$
$$= \begin{bmatrix} h_{11-1} & h_{22-1} \\ h_{11-2} & h_{22-2} \end{bmatrix} \begin{bmatrix} b_1 \\ b_2 \end{bmatrix} + \begin{bmatrix} n_1 \\ n_2 \end{bmatrix}$$
$$= Hb + n$$

The demodulation unit 15 calculates the inverse matrix of the channel information H and reproduces a data sequence as follows:

$$b_0 = H_{-1}Y = b + H_{-1}n.$$

Thus, a signal can be correctly received even when the paths have correlation.

Figure 7:
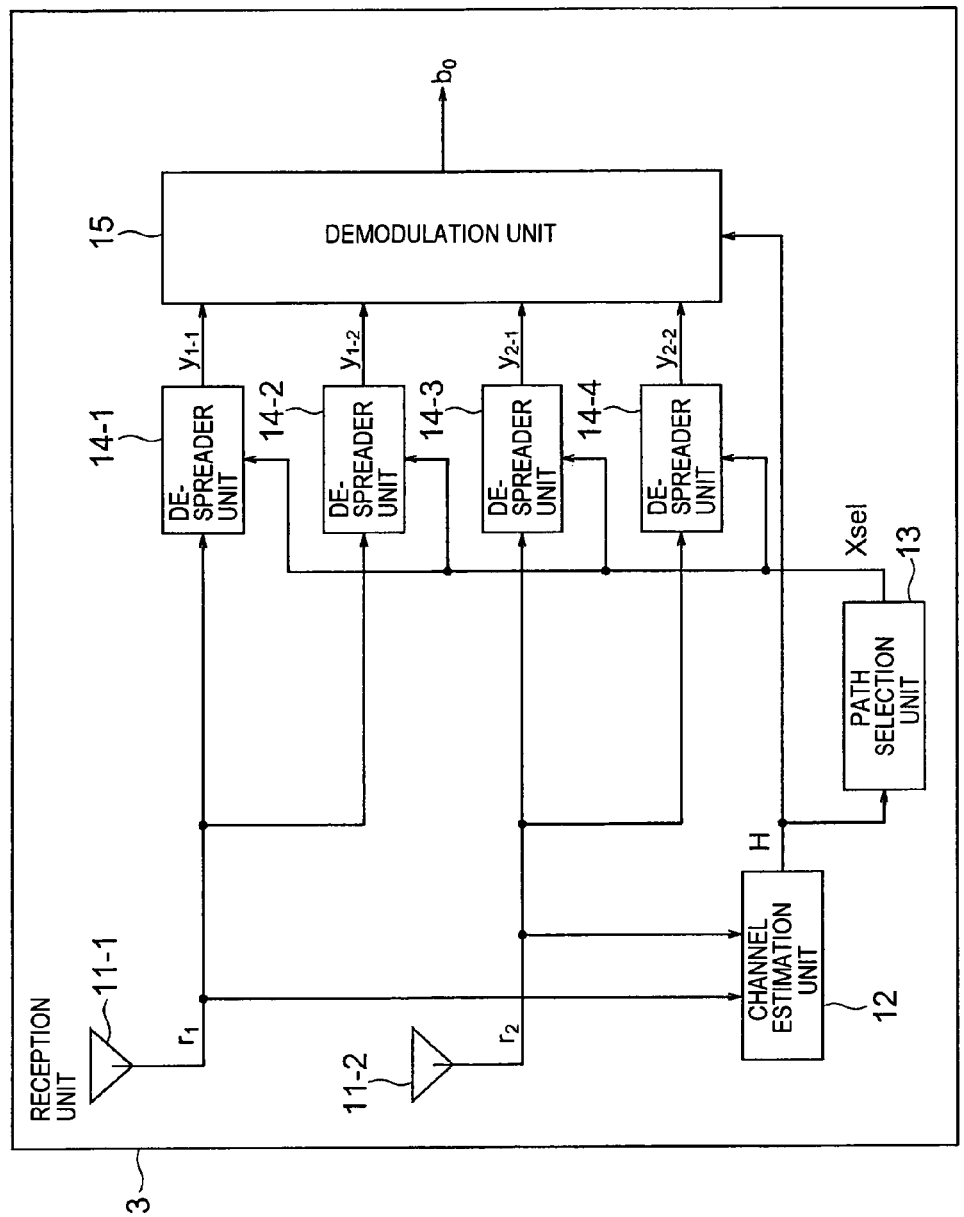
FIG. 7 is a block diagram illustrating the configuration of a reception device having two reception antennas according to another embodiment of the present invention.

FIG. 7 is a block diagram of a reception device according to another embodiment of the present invention. FIG. 8 illustrates an example of a propagation path model according to the embodiment of the present invention. A reception device 3 according to the embodiment of the present invention is described with reference to FIGS. 7 and 8.

In FIG. 7, the reception device 3 includes two reception antennas 11-1 and 11-2. Two de-spreader units 14-1 and 14-2 and two de-spreader units 14-3 and 14-4 are connected to the reception antennas 11-1 and 11-2, respectively. On the other hand, a transmission device (not shown) includes four transmission antennas. Propagation paths between the antennas all include four paths ($\tau_1$ to $\tau_4$) shown in FIG. 8. Here, it is also assumed that signals transmitted from the transmission antennas have complete correlation.

Accordingly, like the path selection unit 13 of the reception device 2 shown in FIG. 6, a path selection unit 13 of the reception device 3 detects a correlation value greater than or equal to a predetermined reference value.

Among priorities of the antennas determined by the path selection unit 13, the first reception antenna 11-1 has the highest priority. As in the example described in relation to FIG. 6, a total set U, a selected path set $U_1$, and an unselected path set $U_2$ are determined as follows:

$$U=\{\tau_1, \tau_2, \tau_3, \tau_4\}$$

$$U_1=0$$

$$U_2=U-U_1=\{\tau_1, \tau_2, \tau_3, \tau_4\}$$

The path selection unit 13 determines one path for each of the reception antennas 11-1 and 11-2. When the path selection unit 13 selects a path from the unselected path set, the reception device 3 preferentially selects a path having high power.

The path selection unit 13 first selects $\tau_1$ as a path selected for the first reception antenna 11-1. Thus, the selected path set $U_1$, and the unselected path set $U_2$ are updated as follows:

$$U_1 = \{\tau_1\}$$

$$U_2 = \{\tau_2, \tau_3, \tau_4\}$$

The path selection unit 13 then selects $\tau_2$, which has the highest power in the unselected path set, as a path selected for the second reception antenna 12. Thus, the selected path set and the unselected path set are updated as follows:

$$U_1 = \{\tau_1, \tau_2\}$$

$$U_2 = \{\tau_3, \tau_4\}$$

Subsequently, the path selection unit 13 selects $\tau_3$ as a path selected for the first reception antenna 11-1 again. Thus, the selected path set $U_1$, and the unselected path set $U_2$ are updated as follows:

$$U_1 = \{\tau_1, \tau_2, \tau_3\}$$

$$U_2 = \{\tau_4\}$$

Finally, the path selection unit 13 then selects $\tau_4$ as a path selected for the second reception antenna 11-2 and outputs a path selection signal $X_{sel}$ obtained here. The two de-spreader units 14-1 and 14-2 and the two de-spreader units 14-3 and 14-4 connected to the respective reception antennas 11-1 and 11-2 de-spread input signals using the path selection information $X_{sel}$ and output de-spreading signals $y_{1-1}$, $y_{1-2}$, $y_{2-1}$, and $y_{2-2}$, respectively.

Here, by considering that these de-spreading signals have complete correlation, the de-spreading signals can be expressed as follows:

$$y_{1-1} = h_{11-1}b_1 + h_{12-1}b_2 + h_{13-1} + h_{14-1} + n_{1-1}$$

$$y_{1-2} = h_{11-3}b_1 + h_{12-3}b_2 + h_{13-3} + h_{14-3} + n_{1-2}$$

$$y_{2-1} = h_{11-2}b_1 + h_{12-2}b_2 + h_{13-2} + h_{14-2} + n_{2-1}$$

$$y_{2-2} = h_{11-4}b_1 + h_{12-4}b_2 + h_{13-4} + h_{14-4} + n_{2-2}$$

These de-spreading signals are also expressed as the following matrix notation (8):

$$Y = \begin{bmatrix} y_{1-1} \\ y_{1-2} \\ y_{2-1} \\ y_{2-2} \end{bmatrix} \tag{8}$$

$$= \begin{bmatrix} h_{11-1} & h_{12-1} & h_{13-1} & h_{14-1} \\ h_{11-3} & h_{12-3} & h_{13-3} & h_{14-3} \\ h_{11-2} & h_{12-2} & h_{13-2} & h_{14-2} \\ h_{11-4} & h_{12-4} & h_{13-4} & h_{14-4} \end{bmatrix} \begin{bmatrix} b_1 \\ b_2 \\ b_3 \\ b_4 \end{bmatrix} + \begin{bmatrix} n_{1-1} \\ n_{1-2} \\ n_{2-1} \\ n_{2-2} \end{bmatrix}$$

$$= Hb + n$$

Therefore, by premultiplying the equation by an inverse matrix of the channel information H, a data sequence is reproduced as follows:

$$b_0 = H_{-1}Y = b + H_{-1}n$$

As described above, by using a reception device according to the present invention, superior communication quality can be obtained even when propagation paths have correlation.

The present invention can be applied as in the above-described embodiment and the other above-described embodiment individually or by combining the two above-described embodiments.

Also, the present invention can be applied to the following configurations and operations.

That is, a reception device according to the present invention includes n number of reception antennas, where n is an integer greater than or equal to 2. The reception device further includes a path selection device and $K_n$ number of de-spreader units for each reception antenna, where $K_n$ is an integer greater than or equal to 1, n denotes an nth antenna, and $1 \leq n \leq K_n$.

The reception antennas receive a spread spectrum signal transmitted from m number of transmit antennas, where m is an integer greater than or equal to 2. The path selection unit inputs the received spread spectrum signal transmitted from the transmit antennas and selects a path for de-spreading at each de-spreader unit. The path selection unit then outputs the selection result as a path selection signal. Each of the de-spreader units inputs the signal received by the reception antenna and the path selection signal and outputs a signal de-spread based on the path selection signal.

The path selection unit calculates a correlation value of propagation paths between m number of the transmit antennas and n number of the reception antennas. If the calculated correlation value is smaller than a predetermined reference value, the path selection unit independently selects $K_n$ number of the paths having a largest power at each of the reception antennas. If the calculated correlation value is larger than the predetermined reference value, the path selection unit preferentially selects $K_n$ number of the paths having a low correlation with paths identified by the other reception antennas, at each of the reception antennas. In this case, the path selection unit employs the amplitude of a complex correlation value as the predetermined reference value.

Additionally, the path selection unit determines priorities for n number of the reception antennas and selects P number of paths for de-spreading at each reception antenna in accordance with the determined priorities, where P is an integer and $1 < P < K_n$. Alternatively, the path selection unit may repeat this processing until the number of paths identified by each reception antenna reaches $K_n$.

Here, when determining the priorities for n number of reception antennas, the path selection unit may carry out the following processing:

(1) Detecting a path having a highest power for each reception antenna from among paths identified by the reception antenna.

(2) Detecting a path having a lowest power for each reception antenna from among paths identified by the reception antenna.

(3) Calculating an average power of paths identified by each reception antenna.

In this case, the path selection unit may assign the priorities as follows:

assigning higher priorities to reception antennas having the detected path with higher power values;

assigning higher priorities to reception antennas having the detected path with lower power values;

assigning higher priorities to reception antennas with higher average power values; or assigning higher priorities to reception antennas with lower average power values.

Furthermore, when determining the priorities for n number of reception antennas, the path selection unit may carry out the following processing:

The path selection unit calculates the number of paths having a power value exceeding $P_{th}$ ($P_{th}$ is any real value) among paths identified by each reception antenna for the antenna. The path selection unit then assigns a higher priority to a reception antenna having more paths having a power value exceeding $P_{th}$. Alternatively, the path selection unit may assign a higher priority to a reception antenna having less paths having a power value exceeding $P_{th}$.

Still furthermore, when determining the priorities for n number of the reception antennas, the path selection unit may carry out the following processing:

The path selection unit detects a path having an earliest incoming time among paths identified each reception antenna for the antenna. The path selection unit then assigns a higher priority to a reception antenna having a path with an earlier incoming time. Alternatively, the path selection unit may assign a higher priority to a reception antenna having a path with a later incoming time.

On the other hand, when determining the priorities for n number of the reception antennas, the path selection unit can calculate an average delay time weighted by the power of a path for paths identified by each reception antenna for the each antenna. Then, the path selection unit can assign a higher priority to a reception antenna having a smaller calculated delay time. Alternatively, the path selection unit may assign a higher priority to a reception antenna having a larger calculated delay time.

When determining the priorities for n number of reception antennas, the path selection unit can determine the priorities among the reception antennas at random.

In addition, when determining the priorities for n number of the reception antennas, the path selection unit can consider a union of sets of the incoming time of paths identified by each reception antenna as a total set and can determine a selected path set using information about selected paths for the reception antenna and the other antennas. The path selection unit can consider a difference between the total set and the selected path set as an unselected path set. Thereafter, the path selection unit can determine a path used for de-spreading based on the unselected path set. In this case, the path selection unit can select a path used for de-spreading at random.

Furthermore, when determining the selected path set, the path selection unit can determine samples from F samples before the incoming time of the path used for de-spreading at one of the reception antennas to B samples after the incoming time as a partial set of the selected path set, where F and B are integers greater than or equal to 0. Then, the path selection unit can create a union set of partial selected path sets for all reception antennas. The obtained set can be used as the selected path set.

Still furthermore, when selecting a path used for de-spreading from a group of unselected paths, the path selection unit can select a path having the highest reception power from among the group of unselected paths, can select a path having the earliest incoming time from among the group of unselected paths, or can select a path from among the group of unselected paths at random.

As described above, according to the present invention, a reception device and a radio communication system that has the above-described configurations and operations can advantageously provide superior communication quality even when the propagation paths have high correlation.

The invention claimed is:

1. A reception device comprising:
n number of reception antennas for receiving spread spectrum signals transmitted from a transmission device via m number of transmit antennas, where m is an integer greater than or equal to 2 and n is an integer greater than or equal to 2;
a path selection unit for selecting a path for de-spreading the signal received by the reception antennas and outputting a selection result as a path selection signal; and
$K_n$ number of de-spreader units for de-spreading the signal received by the reception antennas based on the path selection signal and outputting the de-spread signals, where $K_n$ is an integer greater than or equal to 1, n represents an n-th reception antenna, and $1 \leq n \leq K_n$,
wherein the path selection unit calculates a correlation value of propagation paths among the m number of transmit antennas and the n number of reception antennas and wherein, if the calculation result is smaller than a predetermined reference value, the path selection unit independently selects $K_n$ number of paths having a largest power at each of the n number of reception antennas, and wherein, if the calculation result is greater than the predetermined reference value, the path selection unit preferentially selects $K_n$ number of paths having a low correlation with paths identified by the other reception antennas, at each of the n number of reception antennas.

2. The reception device according to claim 1, wherein the amplitude of a complex correlation value is used as the predetermined reference value.

3. The reception device according to claim 1, wherein the path selection unit determines priorities of the n number of reception antennas, selects P number of paths for de-spreading at each of the n number of reception antennas in accordance with the determined priorities, and repeats the selection until the number of paths identified by each of the n number of reception antennas reaches $K_n$ where P is an integer greater than or equal to 1 and $1 \leq P \leq K_n$.

4. The reception device according to claim 3, wherein the path selection unit detects a path having maximum power from among paths identified by each of the n number of reception antennas for each antenna when determining priorities of the n number of reception antennas and wherein the path selection unit determines the priorities based on the detection result.

5. The reception device according to claim 4, wherein the path selection unit assigns a higher priority to a reception antenna having a detected path of a higher power.

6. The reception device according to claim 4, wherein the path selection unit assigns a higher priority to a reception antenna having a path of a lower detected power.

7. The reception device according to claim 3, wherein the path selection unit detects a path having minimum power from among paths identified by each of the n number of reception antennas for each antenna when determining priorities of the n number of reception antennas and wherein the path selection unit determines the priorities based on the detection result.

8. The reception device according to claim 7, wherein the path selection unit assigns a higher priority to a reception antenna having a path of a lower detected power.

9. The reception device according to claim 7, wherein the path selection unit assigns a higher priority to a reception antenna having a path of a higher detected power.

10. The reception device according to claim 3, wherein the path selection unit calculates average power of paths identified by each of the n number of reception antennas for each antenna when determining priorities of the n number of reception antennas and wherein the path selection unit determines the priorities based on the calculation result.

11. The reception device according to claim 10, wherein the path selection unit assigns a higher priority to a reception antenna having a higher average power value.

12. The reception device according to claim 10, wherein the path selection unit assigns a higher priority to a reception antenna having a lower average power value.

13. The reception device according to claim 3, wherein the path selection unit calculates the number of paths having a power exceeding $P_{th}$ from among paths identified by each of the n number of reception antennas for each antenna when determining priorities of the n number of reception antennas, where $P_{th}$ is any real value, and wherein the path selection unit determines the priorities based on the calculation result.

14. The reception device according to claim 13, wherein the path selection unit assigns a higher priority to a reception antenna having more paths exceeding $P_{th}$.

15. The reception device according to claim 13, wherein the path selection unit assigns a higher priority to a reception antenna having less paths exceeding $P_{th}$.

16. The reception device according to claim 3, wherein the path selection unit detects a path having an earliest incoming time from among paths identified by each of the n number of reception antennas for each antenna when determining priorities of the n number of reception antennas and wherein the path selection unit determines the priorities based on the detection result.

17. The reception device according to claim 16, wherein the path selection unit assigns a higher priority to a reception antenna having a detected path with an earlier incoming time.

18. The reception device according to claim 16, wherein the path selection unit assigns a higher priority to a reception antenna having a detected path with a later incoming time.

19. The reception device according to claim 3, wherein the path selection unit calculates an average delay time weighted by a power of a path among paths identified by each of the n number of reception antennas when determining priorities of the n number of reception antennas, and wherein the path selection unit determines the priorities based on the calculation result.

20. The reception device according to claim 19, wherein the path selection unit assigns a higher priority to a reception antenna having a shorter calculated average delay time.

21. The reception device according to claim 19, wherein the path selection unit assigns a higher priority to a reception antenna having a longer calculated average delay time.

22. The reception device according to claim 3, wherein, when determining priorities of the n number of reception antennas, the path selection unit determines the priorities at random.

23. The reception device according to claim 3, wherein, when determining the path for de-spreading at one of the reception antennas and determining priorities of the n number of reception antennas, the path selection unit determines a union of sets of incoming times of paths identified by each of the n number of reception antennas as a total set, determines a selected path set using path information about paths selected for the reception antenna and the other reception antennas, determines a difference between the total set and the selected path set as an unselected path set, and determines the path used for de-spreading from the unselected path set.

24. The reception device according to claim 23, wherein, when determining the selected path set, the path selection unit determines samples from F samples before the incoming time of the path used for de-spreading at one of the reception antennas to B samples after the incoming time as a partial set of the selected path set, creates a union of the partial set of the selected path set for all of the n number of reception antennas, and determines the created set as the selected path set, where F is an integer greater than or equal to 0 and B is an integer greater than or equal to 0.

25. The reception device according to claim 23, wherein, when determining the path used for de-spreading from the unselected path set, the path selection unit selects a path having the highest reception power from the unselected path set.

26. The reception device according to claim 23, wherein, when determining the path used for de-spreading from the unselected path set, the path selection unit selects a path having the earliest incoming time from the unselected path set.

27. The reception device according to claim 23, wherein, when determining the path used for de-spreading from the unselected path set, the path selection unit selects a path at random from the unselected path set.

28. A radio communication system having:
a reception device comprising:
n number of reception antennas for receiving spread spectrum signals transmitted from a transmission device via m number of transmit antennas, where m is an integer greater than or equal to 2 and n is an integer greater than or equal to 2;
a path selection unit for selecting a path for de-spreading the signal received by the reception antennas and outputting a selection result as a path selection signal; and
$K_n$ number of de-spreader units for de-spreading the signal received by the reception antennas based on the path selection signal and outputting the de-spread signals, where $K_n$ is an integer greater than or equal to 1, n represents an nth reception antenna, and $1 \leq n \leq K_n$,
wherein the reception device selects a path in accordance with a correlation value of propagation paths;
wherein the path selection unit calculates a correlation value of propagation paths among the m number of transmit antennas and the n number of reception antennas, and wherein, if the calculation result is smaller than a predetermined reference value, the path selection unit independently selects $K_n$ number of paths having a largest power at each of the n number of reception antennas, and wherein, if the calculation result is greater than the predetermined reference value, the path selection unit preferentially selects $K_n$ number of paths having a low correlation with paths identified by the other reception antennas, at each of the n number of reception antennas.

29. The radio communication system according to claim 28, wherein the path selection unit determines priorities of the n number of reception antennas, selects P number of paths for de-spreading at each of the n number of reception antennas in accordance with the determined priorities, and repeats the selection until the number of paths identified by each of the n number of reception antennas reaches $K_n$, where P is an integer greater than or equal to 1 and $1 \leq P \leq K_n$.

30. A method comprising:
receiving, at n number of reception antennas, spread spectrum signals transmitted from a transmission device via m number of transmit antennas, where m is an integer greater than or equal to 2 and n is an integer greater than or equal to 2;
selecting, using a path selection unit, a path for de-spreading the signal received by the reception antennas and outputting a selection result as a path selection signal; and de-spreading, using $K_n$ number of de-spreader units, the signal received by the reception antennas based on the path selection signal and outputting the de-spread signals, where $K_n$ is an integer greater than or equal to 1, n represents an n-th reception antenna, and $1 \leq n \leq K_n$, wherein the path selection unit calculates a correlation value of propagation paths among the m number of transmit antennas and the n number of reception antennas and wherein, if the calculation result is smaller than a predetermined reference value, the path selection unit independently selects $K_n$ number of paths having a largest power at each of the n number of reception antennas, and wherein, if the calculation result is greater than the predetermined reference value, the path selection unit preferentially selects $K_n$ number of paths having a low correlation with paths identified by the other reception antennas, at each of the n number of reception antennas.

* * * * *